United States Patent
Li et al.

(10) Patent No.: US 10,638,529 B2
(45) Date of Patent: Apr. 28, 2020

(54) DEVICE TO DEVICE COMMUNICATION METHOD AND APPARATUS

(71) Applicant: Huawei Technologies Co., Ltd., Shenzhen (CN)

(72) Inventors: Chao Li, Beijing (CN); Xingwei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 15/707,420

(22) Filed: Sep. 18, 2017

(65) Prior Publication Data
US 2018/0007726 A1 Jan. 4, 2018

Related U.S. Application Data

(63) Continuation of application No. PCT/CN2015/074630, filed on Mar. 19, 2015.

(51) Int. Cl.
*H04W 76/02* (2009.01)
*H04W 48/16* (2009.01)
(Continued)

(52) U.S. Cl.
CPC .......... *H04W 76/14* (2018.02); *H04L 1/004* (2013.01); *H04W 48/16* (2013.01); *H04W 76/10* (2018.02);
(Continued)

(58) Field of Classification Search
CPC ..... H04W 76/14; H04W 76/11; H04W 76/10; H04W 76/021; H04W 48/16;
(Continued)

(56) References Cited

U.S. PATENT DOCUMENTS

2014/0321314 A1 10/2014 Fodor et al.
2014/0323126 A1 10/2014 Ro et al.
(Continued)

FOREIGN PATENT DOCUMENTS

CN 103108405 A 5/2013
CN 103582069 A 2/2014
(Continued)

OTHER PUBLICATIONS

"Work Item Proposal for Enhanced LTE Device to Device Proximity Services", 3GPP TSG RAN Meeting #66, Maui, USA, RP-142311, 3rd Generation Partnership Project, Valbonne, France (Dec. 8-11, 2014).
(Continued)

*Primary Examiner* — Candal Elpenord
(74) *Attorney, Agent, or Firm* — Leydig, Voit & Mayer, Ltd.

(57) ABSTRACT

Embodiments of the present disclosure provide a device to device (D2D) communication method and apparatus, to resolve at least a problem of a low success rate of discovery between user equipments in the prior art. The method includes: determining, by a first user equipment (UE), first signaling to be sent, where the first signaling includes one or a combination of the following information: a transmission probability, a quantity of retransmission times, a transmission period, a type of a cyclic prefix (CP), a transmit power, a current quantity of hops, a quantity of antenna ports, a transmission mode, a bandwidth of a D2D link, a D2D link frame number, time division duplexing (TDD) uplink and downlink configuration information, or information indicating whether the first UE is within a network; and sending, by the first UE, the first signaling to second UE using the D2D link.

17 Claims, 7 Drawing Sheets

(51) Int. Cl.
    *H04W 84/18*     (2009.01)
    *H04L 1/00*     (2006.01)
    *H04W 28/18*     (2009.01)
    *H04L 29/06*     (2006.01)
    *H04W 4/00*     (2018.01)
    *H04W 76/14*     (2018.01)
    *H04W 76/10*     (2018.01)
    *H04W 76/11*     (2018.01)
    *H04W 4/70*     (2018.01)

(52) U.S. Cl.
    CPC ............ *H04W 76/11* (2018.02); *H04W 84/18* (2013.01); *H04L 69/24* (2013.01); *H04W 4/70* (2018.02); *H04W 28/18* (2013.01)

(58) Field of Classification Search
    CPC ....... H04W 84/18; H04W 4/005; H04W 4/70; H04W 28/18; H04L 1/004; H04L 69/24
    See application file for complete search history.

(56) References Cited

U.S. PATENT DOCUMENTS

| | | |
|---|---|---|
| 2015/0004901 A1 | 1/2015 | Agiwal et al. |
| 2015/0043545 A1* | 2/2015 | Cheng ................... H04W 56/00 370/336 |
| 2015/0045016 A1* | 2/2015 | Xiong ................... H04W 8/005 455/426.1 |
| 2016/0142898 A1* | 5/2016 | Poitau ................... H04W 76/14 370/329 |
| 2016/0212682 A1 | 7/2016 | Chung et al. |
| 2016/0249307 A1* | 8/2016 | Thangarasa ......... H04W 56/001 |
| 2017/0041932 A1* | 2/2017 | Chae ..................... H04W 72/04 |
| 2017/0070968 A1 | 3/2017 | Kim et al. |
| 2017/0244501 A1 | 8/2017 | Yasukawa et al. |
| 2018/0152924 A1* | 5/2018 | Ouchi ............... H04W 72/0453 |

FOREIGN PATENT DOCUMENTS

| | | |
|---|---|---|
| CN | 104244449 A | 12/2014 |
| KR | 20140036476 A | 3/2014 |
| KR | 20150002521 A | 1/2015 |
| KR | 20150022240 A | 3/2015 |
| WO | 2011015250 A1 | 2/2011 |
| WO | 2014068170 A1 | 5/2014 |
| WO | 2014113537 A1 | 7/2014 |
| WO | 2015021317 A1 | 2/2015 |
| WO | 2015122715 A1 | 8/2015 |
| WO | 2016060177 A1 | 4/2016 |

OTHER PUBLICATIONS

"3rd Generation Partnership Project;Technical Specification Group Radio Access Network; Evolved Universal Terrestrial Radio Access (E-UTRA); Physical channels and modulation (Release 12)," 3GPP TS 36.211 V12.5.0, pp. 1-136, 3rd Generation Partnership Project, Valbonne, France (Mar. 2015).

"Operation in Type 1 resource allocation for D2D discovery," 3GPP TSG RAN WG1 Meeting #76bis, Shenzhen, China, R1-141351, pp. 1-9, 3rd Generation Partnership Project, Valbonne, France (Mar. 31, 2014-Apr. 4, 2014).

* cited by examiner

DEVICE TO DEVICE COMMUNICATION METHOD AND APPARATUS

CROSS-REFERENCE TO RELATED APPLICATION

This application is a continuation of International Application No. PCT/CN2015/074630, filed on Mar. 19, 2015, the disclosure of which is hereby incorporated by reference in its entirety.

TECHNICAL FIELD

The present disclosure relates to the field of wireless communications, and in particular, to a device to device (D2D) communication method and apparatus.

BACKGROUND

With continuous development of wireless communications system technologies, to implement communication, a D2D communication mode, in addition to a conventional cellular communication mode, may also be used. In the cellular mode, a user equipment (UE) communicates with another UE by using a base station. In the D2D communication mode, UE directly communicates with another UE. For a UE, D2D communication not only saves radio resources and spectrum resources but also lowers a pressure of a core network. Therefore, a D2D technology becomes an important technology that can face the Fifth Generation (5G) and that is being currently standardized in the Third Generation Partnership Project (3GPP) standard.

In the D2D communication mode, one technology is device discovery. Device discovery refers to a process in which devices participating in D2D communication determine mutual existence before transmitting D2D information. In the prior art, devices participating in D2D communication implement device discovery under scheduling by a core network device. The core network device herein may be a base station in a cellular communications network or a similar device.

However, in some scenarios in which D2D communication is frequently applied, for example, when devices participating in D2D communication are at a position, such as a basement or an elevator hatchway, at which the devices cannot establish a wireless connection to a core network device, or at a position at which the devices establish an unstable wireless connection to a core network device, the devices participating in D2D communication have a low success probability when performing device discovery, and consequently D2D communication is affected.

SUMMARY

Embodiments of the present disclosure provide a device to device D2D communication method and apparatus, to resolve at least a problem of a low success rate of discovery between user equipments in the prior art.

According to an aspect, an embodiment of the present disclosure provides a device to device D2D communication method. The method includes the following steps.

First user equipment (UE) determines to-be-sent first signaling. The first signaling includes one or a combination of the following information: a transmission probability, a quantity of retransmission times, a transmission period, a type of a cyclic prefix (CP), a transmit power, a current quantity of hops, a quantity of antenna ports, a transmission mode, a bandwidth of a D2D link, a D2D link frame number, time division duplexing TDD uplink and downlink configuration information, or information indicating whether the first UE is within a network. The first UE sends the first signaling to second UE by using the D2D link.

In a possible design, the first UE may determine the first signaling by itself according to a predetermined rule. In another design, the first UE may also receive first signaling that is sent by third UE by using the D2D link and determine the to-be-sent first signaling according to the first signaling sent by the third UE. The to-be-sent first signaling determined by the first UE and the first signaling sent by the third UE may be the same or different in formats or content. In another design, a base station may configure first signaling for the first UE and send the configured first signaling to the first UE. The first UE receives the first signaling sent by the base station and determines the to-be-sent first signaling according to the first signaling sent by the base station. The to-be-sent first signaling determined by the first UE and the first signaling configured by the base station may be the same or different in formats or content.

In a possible design, after the first UE receives the first signaling that is sent by the third UE by using the D2D link, the first UE may receive or send data according to the first signaling sent by the third UE.

In a possible design, first information of at least one piece of information included in the first signaling is further used to implicitly indicate second information of the at least one piece of information included in the first signaling. For example, information that may be included in the to-be-sent first signaling determined by the first UE has an association relationship. The first UE may carry a part of the information in the to-be-sent first signaling. The second UE receives the part of the information sent by the first UE, and may know, according to the association relationship, other information associated with the part of the information. By means of such a design, resources occupied by the first signaling may be saved.

In a possible design, the first UE may transmit a D2D synchronization signal in the D2D link. Optionally, the D2D synchronization signal includes a primary sidelink synchronization signal PSSS and a secondary sidelink synchronization signal SSSS, sidelink synchronization signal identities SLSSIDs that correspond to the PSSS and the SSSS are integers not less than 336, and the SLSSIDs are used to identify a channel carrying the first signaling in the D2D link.

In a possible design, the first UE sends the first signaling to the second UE by using a dedicated control channel or a non-control channel in the D2D link. For example, a reserved field included in the dedicated control channel may be used, and some or all bits in the reserved field are used to carry the first signaling.

In a possible design, the dedicated control channel may further carry second signaling, and the second signaling is used to identify that the dedicated control channel is a channel carrying the first signaling.

In another possible design, the dedicated control channel may carry a demodulation reference signal DMRS, the DMRS is used to identify that the dedicated control channel is a channel carrying the first signaling, and a generation parameter u corresponding to the DMRS satisfies: $u = (f_{gh}(n_s) + f_{ss}) \mod 30 + b$, where $n_s$ is a non-negative integer and represents a timeslot number or a subframe number, $f_{gh}(n_s)$ is an integer and represents a sequence group hop, $f_{ss}$ is an integer and represents a sequence hop, mod represents a modulo operation, and b is a non-zero integer. Preferably, $f_{ss}$ satisfies: $f_{ss}=((SLSSID \bmod 30)+\Delta) \bmod 30$, where SLSSID is an integer not less than 0, and $\Delta$ is a non-zero constant.

In a possible design, the dedicated control channel is scrambled by using a scrambling sequence when being generated, the scrambling sequence is used to identify that the dedicated control channel is a channel carrying the first signaling, and an initial value $c_{init}$ used when the scrambling sequence is generated satisfies: $c_{init}$=nSLSSID or $c_{init}=n_{RNTI}*2^{14}+q*2^{13}+\lfloor n_s/2 \rfloor*2^9+$SLSSID, where $n_{RNTI}$, q, and $n_s$ are all non-zero integers, SLSSID is an integer not less than 0, and nSLSSID is an integer not less than 336.

In a possible design, the dedicated control channel uses a cyclic redundancy check CRC mask when being generated, and the CRC mask is used to identify that the dedicated control channel is a channel carrying the first signaling.

In a possible design, the first signaling sent by the first UE to the second UE is carried in one or a combination of the following manners: a CRC mask, a D2D synchronization signal, or a DMRS.

When the first signaling is carried by the D2D synchronization signal, different sequences of the D2D synchronization signal are divided into M subgroups, and the M subgroups are used to carry information not exceeding n=floor($\log_2$ (M)) bits, where a floor function represents rounding down to the nearest integer.

When the first signaling is carried by the DMRS, the first signaling is carried by modulation symbols on two neighboring DMRSs in the D2D link; the first signaling is carried by a modulation symbol on either of two neighboring DMRSs in the D2D link; or the first signaling is carried by cyclic shifts of different DMRSs in the D2D link.

In a possible design, if the first UE is in-network UE, the first UE satisfies at least one of a condition A or a condition B: the condition A: quality of a signal that is received by the first UE and that is from the base station is less than a first threshold; and the condition B: quality of a signal that is received by the first UE and that is from out-of-network D2D UE is greater than a second threshold.

If the first UE is out-of-network UE, the first UE satisfies a condition C: quality of a signal that is received by the first UE and that is from another UE is less than a third threshold.

According to another aspect, an embodiment of the present disclosure further provides a user equipment (UE), including corresponding modules configured to perform behaviors of the first UE in the foregoing method designs. The modules may be software and/or hardware.

In a possible design, the user equipment (UE) includes a processor and a memory. The processor is configured to support the UE to perform corresponding functions in the foregoing method. The memory is configured to be coupled to the processor and stores necessary program instructions and data of the UE.

According to still another aspect, an embodiment of the present disclosure further provides a communications system. The system includes the first UE and the second UE in the foregoing aspects. The system may also include the third UE or the base station in the foregoing aspects.

According to yet another aspect, an embodiment of the present disclosure provides a computer storage medium, configured to include programs involved in performing the foregoing aspects.

Based on the D2D communication method, the user equipment, and the system that are provided in the embodiments of the present disclosure, on one hand, a D2D device (first UE) sends first signaling to another D2D device (second UE) by using a D2D link, so that different D2D devices can receive and transmit data by using same parameters in a same resource pool (a set of user resources) when sending a D2D discovery signal, so as to implement D2D discovery between partially covered or out-of-network covered user equipments. On the other hand, a D2D device (first UE) sends first signaling to another D2D device (second UE), so that a format of the D2D discovery signal may be limited and unified, so as to adjust transmission among multiple UEs, reducing mutual conflict and interference in a D2D discovery process and improving transmission efficiency.

DESCRIPTION OF EMBODIMENTS

The following describes the technical solutions in the embodiments of the present disclosure with reference to the accompanying drawings in the embodiments of the present disclosure. Apparently, the described embodiments are merely a part rather than all of the embodiments of the present disclosure. The following descriptions are intended for explanation rather than limitation, and some specific details are stated for clear understanding. In some embodiments, detailed descriptions of common apparatuses, circuits, and methods are omitted, to avoid making descriptions blurry because of unnecessary details. In entire descriptions, same reference numbers and same names refer to same or similar elements.

Figure 1:
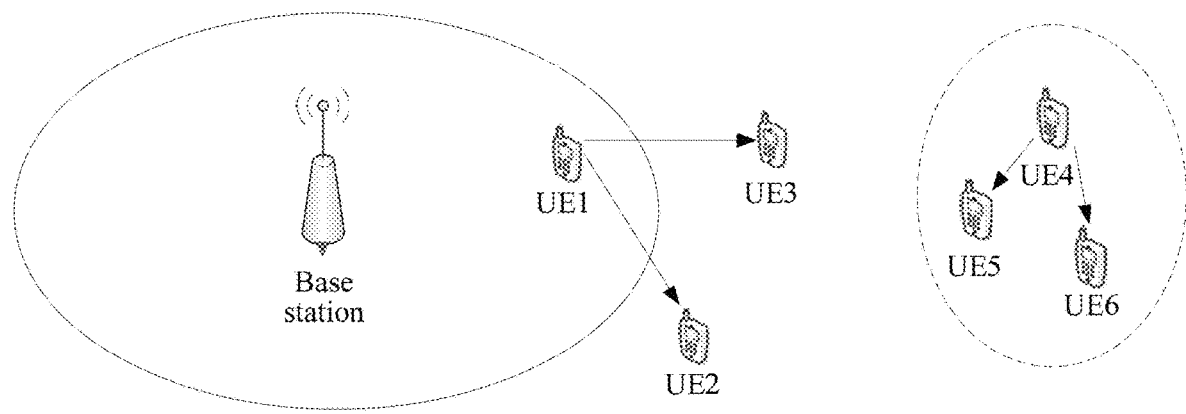
FIG. 1 is a schematic diagram of a communications system according to an embodiment of the present disclosure.
Figure 2:
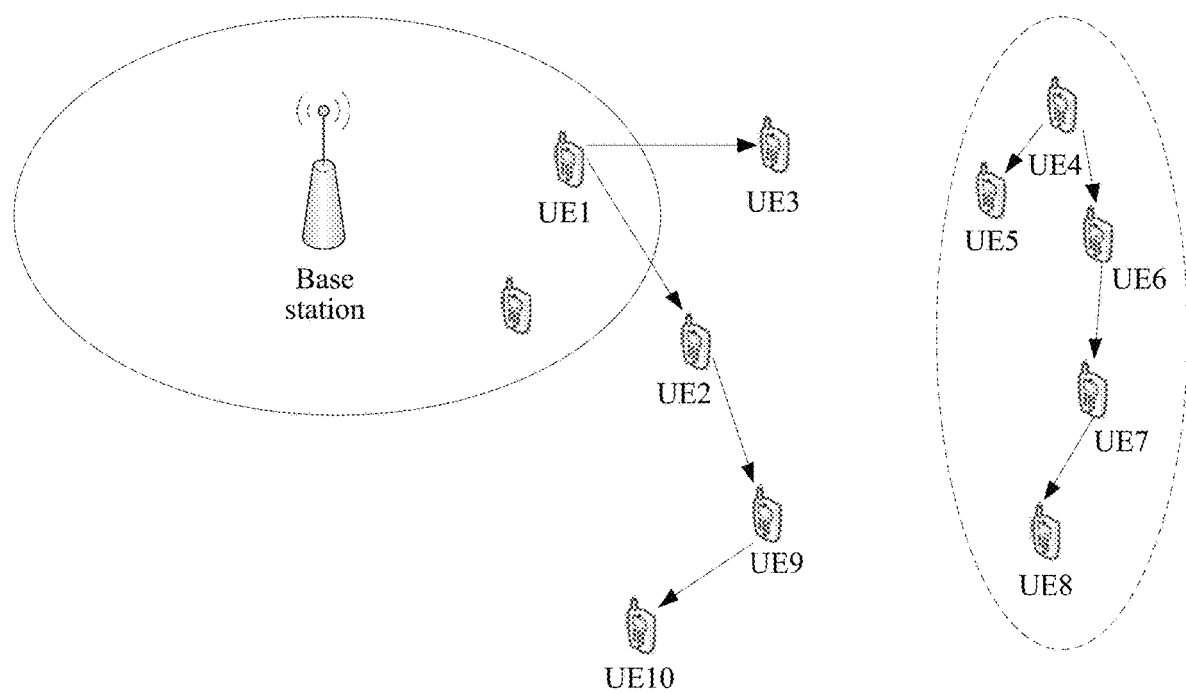
FIG. 2 is a schematic diagram of another communications system according to an embodiment of the present disclosure.

FIG. 1 and FIG. 2 show, in a form of a schematic diagram, scenario environments to which the embodiments of the present disclosure may be applied. A scenario includes a cellular communication mode in which a base station is used as a scheduling core and user equipment is used as a scheduled object and also includes a D2D communication mode in which user equipments directly communicate with each other. In the cellular communication mode, a user equipment (UE) communicates with another UE by means of a base station in a conventional manner. In the D2D communication mode, UEs directly communicate with each other. No mutual forwarding of multi-hop D2D data or signaling exists between D2D UEs in FIG. 1. Mutual forwarding of multi-hop D2D data or signaling may exist between D2D UEs in FIG. 2.

The D2D communication modes shown in FIG. 1 and FIG. 2 both have two different application scenarios. Left parts in FIG. 1 and FIG. 2 show the D2D communication mode with partial network coverage, that is, a part (for example, UE 1) of UEs performing D2D communication is within coverage of a base station in a cellular network, and another part (for example, UE 2 and UE 3) of the UEs performing D2D communication is beyond the coverage of the base station. The UE (such as the UE 1) within the coverage of the base station may establish a wireless connection to the base station and may also be referred to as in-network UE. The UE beyond the coverage of the base station may also be referred to as out-of-network UE. It can be understood that there may be one or more in-network UEs, and there may be one or more out-of-network UEs. Right parts in FIG. 1 and FIG. 2 show the D2D communication mode of a scenario without network coverage, that is, all UEs (for example, UE 4 and UE 5) performing D2D communication are all located beyond the coverage of the base station.

In a scenario shown in FIG. 1, the UE 1 is located within the coverage of the base station and can establish a wireless connection to the base station. Therefore, the UE 1 is located within a network. UE 2, UE 3, UE 4, UE 5, UE 6, UE 7, UE 8, UE 9, and UE 10 are located beyond the coverage of the base station. Therefore, these UEs are located outside the network. It should be noted that in the scenario shown in FIG. 1, although a mutual wireless connection may be established between the UE 4, the UE 5, the UE 6, the UE 7, and the UE 8 in a form of, for example, an ad hoc network, because the base station in the cellular network does not participate, that is, the UEs are located beyond the coverage of the base station, these UEs are still considered to be located outside the network.

To more clearly describe the embodiments of the present disclosure, words such as "first", "second", and "third" are used in this text to distinguish same or similar items having basically same functions and effects. A person skilled in the art can understand that words such as "first", "second", and "third" do not limit a quantity and an execution sequence. In the D2D communication mode, a D2D device may also be referred to as D2D UE or UE. First UE, second UE, and third UE in this text are relative concepts. The D2D device may be used as both a receive end in a D2D link and a transmit end in another D2D link.

The embodiments of the present disclosure provide a D2D communication method, a D2D device, and a communications system. Solutions provided in the embodiments of the present disclosure may be applied to D2D communication in a scenario based on a 3GPP LTE system (for example, the scenarios shown in FIG. 1 and FIG. 2), and may be also applied to D2D communication based on another communications system and D2D communication based on a subsequent evolved system.

Figure 3:
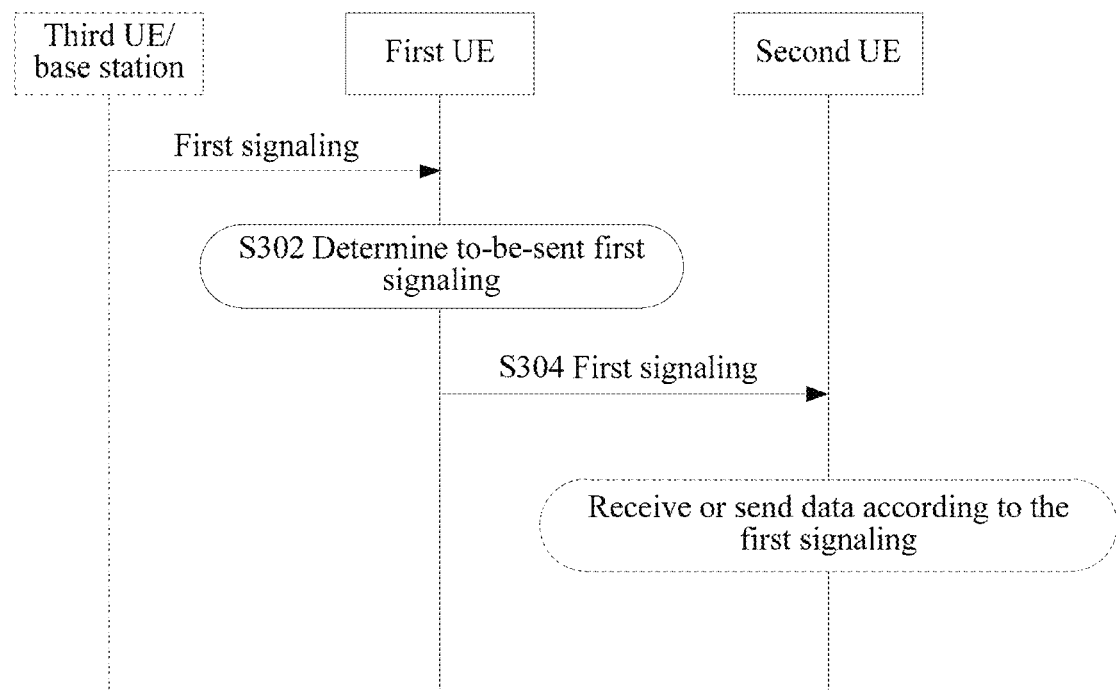
FIG. 3 is a schematic flowchart of a D2D communication method according to an embodiment of the present disclosure.

FIG. 3 is a schematic flowchart of a D2D communication method. A method process includes the following steps.

S302: A D2D device (for example, first UE) determines to-be-sent first signaling. The first signaling may be used for D2D discovery.

For example, the first UE may determine the first signaling by itself according to preconfigured information. Alternatively, the first UE may determine the first signaling according to information obtained from a base station or another D2D device. In an example, the first UE may receive first signaling sent by another D2D device (such as third UE) and determine, according to the received first signaling, the to-be-sent first signaling of the first UE. In this case, the first UE is equivalent to performing relay transmission. In another example, the base station may configure the first signaling of the first UE and send the configured first signaling to the first UE.

The to-be-sent first signaling of the first UE, the first signaling sent by the another D2D device (such as the third UE), or the first signaling configured by the base station may include one or a combination of the following signaling: a transmission probability, a quantity of retransmission times, a transmission period, a type of a cyclic prefix (CP), a transmit power, a current quantity of hops, a quantity of antenna ports, a transmission mode, a bandwidth of a D2D link, a D2D link frame number, time division duplexing (TDD) uplink and downlink configuration information, or information indicating whether the first UE is within a network.

In a specific implementation process, a standard for sending a D2D discovery signal is coordinated and unified between UEs by using first signaling, to provide a reference standard for subsequent sending of a D2D discovery signal between UEs, so as to improve a success probability of D2D discovery in a D2D discovery process.

S304: The first UE sends the first signaling to second UE. For example, the first UE may send the first signaling to the second UE by using a dedicated control channel or a non-control channel in a D2D link.

Specifically, in this embodiment of the present disclosure, a D2D device (the first UE) may send first signaling to another D2D device (the second UE), and the first signaling may include any one or more pieces of information of the listed information. For example, the first signaling includes the transmission probability. Alternatively, the first signaling includes the transmission probability, the quantity of retransmission times, the transmission period, and the like. This is not specifically limited in this embodiment of the present disclosure. The foregoing listed information is briefly described separately below.

Transmission Probability

D2D discovery is divided into a type 1 and a type 2. The type 1 refers to that a transmission resource used by UE serving as a transmit end is configured to a group of UEs in a predefined or preconfigured resource pool during D2D discovery. Each UE selects a transmission resource of the UE in the resource pool. The type 2 refers to that a transmission resource used by UE serving as a transmit end is configured by a network each time during D2D discovery. The network herein may be a network device such as a base station. When this embodiment of the present disclosure is used for D2D discovery of the type 1, the UE serving as a transmit end, that is, the first UE, randomly selects a transmission resource in the predefined or preconfigured resource pool according to a particular transmission probability Pb, or may carry information about a transmission probability Pb in the first signaling sent to UE serving as a receive end, that is, the second UE.

For example, in a partial coverage scenario shown in the left parts of FIG. 1 and FIG. 2, in-network UE 1 may send the transmission probability Pb to out-of-network UE 2 and UE 3. Out-of-network UEs such as the UE 2 and the UE 3 may randomly select a transmission resource on a corresponding resource by using the transmission probability Pb sent by the UE 1, so as to send, according to the transmission resource obtained by random selection, a D2D discovery signal of the transmission resource. That the in-network UE sends the transmission probability to the out-of-network UE is equivalent to that the in-network UE controls a use intensity of a resource of the out-of-network UE (for example, a greater probability indicates a higher use intensity of the resource), to ensure that the in-network and out-of-network UEs have a same discovery opportunity during mutual discovery, facilitating mutual discovery of the in-network and out-of-network UEs.

For example, in a scenario without network coverage shown in the right parts of FIG. 1 and FIG. 2, out-of-network UE 4 may send the transmission probability Pb to out-of-network UE 5 and UE 6. Out-of-network UEs such as the UE 5 and the UE 6 may randomly select a transmission resource on a corresponding resource by using the transmission probability Pb sent by the UE 4, so as to send, according to the obtained transmission resource, a D2D discovery signal of the transmission resource. That is, that the out-of-network first UE sends the transmission probability to the out-of-network second UE is equivalent to that the out-of-network first UE controls a use intensity of a resource of the out-of-network second UE (for example, a greater probability indicates a higher use intensity of the resource), to ensure that the out-of-network UEs have a same discovery opportunity during mutual discovery, facilitating mutual discovery of the out-of-network UEs.

It can be understood that to reduce a quantity of bits occupied by the transmission probability Pb in the first signaling, the transmission probability Pb may be quantized by using limited bits. For example, two bits are used to indicate Pb, and Pb may be quantized into the following four values: {0.25, 0.50, 0.75, 1}.

Quantity of Retransmission Times

Similar to the transmission probability, the first UE may carry information about the quantity of retransmission times in the first signaling sent to the second UE, to instruct the second UE to receive or send data according to the quantity of retransmission times. For example, when the first UE sends a D2D discovery signal, the first UE sends the D2D discovery signal of the first UE according to a particular quantity of retransmission times. The second UE needs to receive, according to the quantity of retransmission times indicated by the first UE in the first signaling, the D2D discovery signal sent by the first UE, or otherwise, possibly cannot correctly receive the D2D discovery signal sent by the first UE. For another example, when the second UE is used as relay UE and starts to send the D2D discovery signal of the second UE outwards, the second UE may also send the D2D discovery signal according to the quantity of retransmission times indicated in the first signaling received by the second UE. In this way, it can be ensured that UE receiving the D2D discovery signal can also receive, according to the quantity of retransmission times, the D2D discovery signal sent by the second UE.

In a specific implementation process, a retransmitted data packet in multiple times of retransmission may be a same version of a same data packet or may be different versions that carry same information but that use different frequencies, coding schemes, modulation schemes, or transmission rates.

It can be understood that for different quantities of retransmission times, a quantity of bits as few as possible may be used for indication to save signaling overheads. For example, two bits are used to indicate the quantity of retransmission times, and the quantity of retransmission times may be quantized into the following four values: {1, 2, 3, 4}. Certainly, it can be understood that indication may be performed by using one or more bits. This is not specifically limited in this embodiment of the present disclosure.

Transmission Period

Because the D2D discovery signal is a discovery signal of a specific format of a D2D device, sending of the D2D discovery signal may have a particular delay. Considering that a greater delay can support parallel sending by more users, a transmission period of a D2D discovery signal may be defined. Within the transmission period, one D2D discovery signal is sent only once. If a transmission period of the D2D discovery signal is properly prolonged, an effect on power consumption brought by the D2D device due to the sending of the D2D discovery signal may also be reduced. Similar to the quantity of retransmission times, the transmission period may be carried in the first signaling sent by the D2D device.

It can be understood that to reduce a quantity of bits occupied by a discovery period in the first signaling, the discovery period may be quantized by using limited bits. For example, three bits are used to indicate the discovery period. The discovery period may be quantized into the following six values: {32, 64, 128, 256, 512, 1024}. A unit of the discovery period may be a radio frame (for example, each radio frame occupies duration of 10 ms) or a radio subframe (for example, each radio subframe occupies duration of 1 ms). This is not specifically limited in this embodiment of the present disclosure.

CP Type

The CP type includes a long CP or a short CP. A quantity of sampling points occupied by the long CP is relatively large. For example, using parameters of a Long Term Evolution (LTE) system as an example, a quantity of sampling points corresponding to a 20 MHz bandwidth is 512, and a corresponding time length is 16.7 μs. A quantity of sampling points occupied by the short CP is relatively small. For example, using parameters of an LTE system as an example, a quantity of sampling points corresponding to a 20 MHz bandwidth is 160 (corresponding to a first Orthogonal Frequency Division Multiplexing (OFDM) symbol on each subframe) or 144 (corresponding to a symbol other than a first OFDM symbol on each subframe), and a corresponding time length is separately 5.2 μs or 4.7 μs.

For example, the first UE may carry indication information in the first signaling sent to the second UE to indicate the CP type of the first UE. The second UE receives the first signaling, and can know the CP type. Therefore, the second UE does not need to perform blind detection according to different CP types, so as to lower receiving complexity. In addition, in a D2D discovery group, mutual interference caused by multiple UEs due to use of different CP types may be avoided.

It can be understood that because the CP type includes two statuses, the long CP and the short CP, one bit may be preferably used for indication, so as to reduce signaling overheads. Certainly, it can be understood that indication may also be performed by using multiple bits. This is not specifically limited in this embodiment of the present disclosure.

Transmit Power

The first UE may carry information about the transmit power in the first signaling sent to the second UE. For the transmit power of the D2D discovery signal, if the transmit power is excessively large, unnecessary interference may be caused. If the transmit power is excessively small, coverage of the D2D discovery signal may be affected. For example, the transmit power may be a current transmit power, a maximum transmit power, a minimum transmit power, or a transmit power threshold interval. This is not specifically limited in this embodiment of the present disclosure.

It can be understood that the second UE may use the transmit power indicated in the first signaling sent by the first UE. The second UE may also determine the transmit power. A value of the transmit power determined by the second UE satisfies a requirement of the transmit power indicated by the first UE, for example, is not greater than the maximum transmit power, is not less than the minimum transmit power, or is located within the transmit power threshold interval.

For example, in the scenario of partial coverage shown in the left parts of FIG. 1 and FIG. 2, the in-network UE 1 may indicate to the out-of-network UE 2 and UE 3 the transmit power, for example, the current transmit power, the maximum transmit power, the minimum transmit power, or the transmit power threshold interval. Therefore, the first UE may control the transmit powers or transmit power ranges of the out-of-network UE 2 and UE 3, so as to ensure quality of the D2D discovery signal and avoid or lower potential interference between the first UE and another in-network UE.

For example, in the scenario without network coverage shown in the right parts of FIG. 1 and FIG. 2, the out-of-network UE 4 may indicate to the out-of-network UE 5 and UE 6 the transmit power, for example, the current transmit power, the maximum transmit power, the minimum transmit power, or the transmit power threshold interval. Therefore, the UE 4 may control a transmit power or a transmit power range within a specific out-of-network D2D discovery group, so as to avoid or lower potential interference between different out-of-network D2D discovery groups under a condition that coverage is ensured.

It can be understood that to reduce a quantity of bits occupied by the transmit power in the first signaling, the transmit power may be quantized by using limited bits. For example, two bits are used to indicate the transmit power, and the transmit power may be quantized into the following four values: {10, 16, 23, 31} dBm. A value into which the transmit power is specifically quantized depends on an upper limit value and a lower limit value of a maximum transmit power value that is finally supported by the system.

Current Quantity of Hops

The current quantity of hops is used to indicate a current quantity of hops when D2D data is forwarded or a current quantity of hops when the D2D synchronization signal is received. When multi-hop D2D data or signaling is allowed to be forwarded, coverage of a D2D discovery signal group may be expanded, and transmit powers of the UEs are not increased.

For example, when a D2D synchronization signal of particular UE is regularly forwarded by multiple intermediate UEs, UE at a receive end may determine synchronous source selection according to information about a current quantity of hops sent by the intermediate UEs.

For example, when D2D data is forwarded for multiple times, the second UE may receive data packets of same UE that are forwarded by multiple first UEs. In this case, the second UE may determine, according to the information about the current quantity of hops sent by the multiple first UEs, to receive a data packet sent by first UE. Alternatively, the information about the current quantity of hops sent by the multiple first UEs may provide a reference indication to a combination of the data packets sent by the multiple first UEs.

It should be noted that information about a combination of the current quantity of hops and a maximum quantity of forwarding hops can limit a quantity of times for which D2D data or signaling is allowed to be forwarded, so that the coverage of the D2D discovery signal may be controlled within a proper range.

It can be understood that to reduce a quantity of bits occupied by the current quantity of hops in the first signaling, the current quantity of hops may be quantized by using limited bits. For example, if a maximum allowed quantity of hops is defined (indicated by signaling or preconfigured) as 3, two bits may be used to indicate the current quantity of hops.

Quantity of Antenna Ports

In the D2D communication mode, the first UE may carry information about the quantity of antenna ports in the first signaling sent to the second UE, so that the second UE receives or sends data according to the information about the quantity of antenna ports.

For example, when the quantity of antenna ports is 1, it indicates that a single antenna mode is currently used by the first UE. Correspondingly, the second UE receives data in the single antenna mode. For another example, when the quantity of antenna ports is 2, it indicates that a multiple-input multiple-output (MIMO) mode is currently used by the first UE. In an example, the first UE may also indicate, by using the first signaling or another signaling, a MIMO mode that the first UE specifically uses currently. For example, a MIMO mode that is specifically used is indicated by using signaling in a MIMO transmission mode. Detailed description is not provided herein in this embodiment of the present disclosure.

It can be understood that one or more bits may be used to indicate the quantity of antenna ports. For example, to reduce a quantity of bits occupied by the quantity of antenna ports in the first signaling, the quantity of antenna ports may be quantized by using bits as few as possible. For example, two bits are used to indicate the quantity of antenna ports, and the quantity of antenna ports may be quantized into the following four values: {1, 2, 4, 8}.

Transmission Mode

The transmission mode is used to distinguish various specific transmission manners. Different transmission manners correspond to different structures of transmitters and receivers and also correspond to different transmission effects. Specifically, the transmission mode provided in this embodiment of the present disclosure may include at least one of the following transmission modes:

a nonlinear transmission mode or a MIMO transmission mode.

The nonlinear transmission mode is a mode other than linear transmission modes such as the MIMO transmission mode and includes non-orthogonal nonlinear transmission modes, such as single-user superimposed coding and multi-user non-orthogonal transmission. The single-user superimposed coding is specific to single UE and may be that the first UE superimposes different data symbols on a same transmission resource with different powers and sends the data symbols to the second UE. Alternatively, the first UE superimposes, with different powers, codewords obtained after different data packets are coded and then sends the codewords to the second UE on a same transmission resource. The second UE may separately demodulate on a same transmission resource by using a method such as serial-parallel interference cancellation to obtain two different pieces of data. The multi-user non-orthogonal transmission is specific to multiple UEs. When data of two first UEs are not orthogonal in resources (time, frequencies, codewords, or space), data is simultaneously sent to multiple second UEs. For example, when two first UEs are not orthogonal in space, data may be sent to different second UEs by using same or partially same time frequency resources. Different second UEs may first demodulate to obtain a signal of the first UE with a greater power and then demodulate to obtain a weaker signal of the first UE according to a serial interference cancellation method. In summary, any nonlinear transmission mode is characterized by transmitting multiple pieces of data on a same resource, so as to drastically improve transmission efficiency. In addition, nonlinear transmission is not limited to multiple antennas, that is, UE with a single antenna may also use nonlinear transmission.

The MIMO transmission mode includes transmit diversity or spatial multiplexing. The transmit diversity includes: a Space Frequency Block Code (SFBC) mode, a Space Time Block Code (STBC) mode, a large-delay Cyclic Delay Diversity (CDD) mode, and the like. The spatial multiplexing is transmitting multiple pieces of data on a same time frequency resource by using a space domain resource, and needs to indicate information including a quantity of codewords (such as a single codeword and double codewords), a quantity of space layers (such as Layer 1, Layer 2, Layer 3, and Layer 4), or the like. Different MIMO modes support different application scenarios. Generally, the transmit diversity can improve robustness of a radio link, and can improve an equivalent received signal-to-noise ratio of the second UE under a same transmit power. The spatial multiplexing can improve transmission efficiency of per unit time frequency resource under a same transmit power, that is, a single time frequency resource can transmit more data. The first UE may select a proper MIMO transmission mode according to a need of current transmission (a need of improving reliability of coverage or a link or a need of improving transmission efficiency).

It should be noted that the MIMO spatial multiplexing is usually orthogonal or approximately orthogonal in space. In addition, a receiver also uses a linear equalization receiver to receive and demodulate data. This is a key difference with nonlinear transmission.

It can be understood that one or more bits may be used to indicate the transmission mode. For example, to reduce a quantity of bits occupied by the transmission mode in the first signaling, the transmission mode may be quantized by using bits as few as possible. For example, two bits are used to indicate a quantity of space layers and separately correspond to Layers {1, 2, 3, 4}. Two bits are used to indicate a mode of the transmit diversity and separately correspond to {SFBC, STBC, CDD}.

Bandwidth of D2D Link

The bandwidth of the D2D link is used to indicate a maximum bandwidth when sending is performed on the D2D link.

If the first UE indicates the bandwidth of the D2D link in the first signaling sent to the second UE, the second UE may receive and transmit the D2D discovery signal only within a frequency domain range indicated by the bandwidth of the D2D link, so as to limit a range of a bandwidth of sending and receiving on the D2D, so that different UEs receive and transmit data on a specified bandwidth, to facilitate mutual discovery between devices.

It can be understood that to reduce a quantity of bits occupied by the bandwidth of the D2D link in the first signaling, the bandwidth of the D2D link may be quantized by using limited bits. For example, six statuses of three bits are used to indicate the bandwidth of the D2D link, and the bandwidth of the D2D link may be quantized into {6, 15, 25, 75, 100} physical resource blocks (PRBs).

D2D Link Frame Number

In D2D communication, UE at a transmit end may carry information about the D2D link frame number in the first signaling sent to UE at a receive end. The D2D link frame number is used to unify relative timing reference relationships between UEs within a group, so that receiving and transmission of UEs are aligned on a time domain. The transmission period of the D2D discovery signal has actual meanings and effects due to existence of the information about the D2D link frame number. The D2D link frame number may specifically be a radio subframe number and a frame index of the D2D link. This is not specifically limited in this embodiment of the present disclosure.

It can be understood that to reduce a quantity of bits occupied by the D2D link frame number in the first signaling, the D2D link frame number may be quantized by using limited bits. For example, ten bits may be used to indicate serial numbers of {0, 1, . . . , 1023}, 1024 radio frames in total.

TDD Uplink and Downlink Configuration Information

In D2D communication, UE at a transmit end may carry the TDD uplink and downlink configuration information in the first signaling sent to UE at a receive end. The information is used to indicate a configuration ratio of uplink subframes to downlink subframes in a TDD system. The configuration ratio is used to indicate subframes that are used for uplink transmission and subframes that are used for downlink transmission under different configurations. If subframes used for uplink transmission are incorrectly used for downlink transmission, mutual communication cannot be implemented, and interference between receiving and transmission links between different TDD UEs is caused. Table 1 is a list of TDD uplink and downlink configuration information in an LTE system. D represents a downlink subframe, U represents an uplink subframe, and S represents a switching subframe from downlink to uplink.

TABLE 1

| TDD uplink and downlink configuration information | Switching point period from downlink to uplink | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It should be noted that currently, the TDD uplink and downlink configuration information in the LTE system has seven statuses shown in Table 1. The seven statuses may be indicated by using three bits.

Information Indicating Whether the First UE is within a Network

UE at a transmit end may carry, in the first signaling sent to UE at a receive end, the information indicating whether the first UE is within a network. The information is used to indicate whether the UE at the transmit end is within a network or is covered by a base station.

For example, in a scenario of partial coverage shown in the left parts of FIG. 1 and FIG. 2, the in-network UE 1 may send to the out-of-network UE 2 and UE 3 the information indicating whether the first UE is within a network. Out-of-network UEs such as the UE 2 and the UE 3 may determine, by using the information that indicates whether the first UE is within a network and that is sent by the UE 1, whether the D2D discovery signal sent by the UE 1 is from the in-network UE, so that when the out-of-network UEs such as the UE 2 and the UE 3 receive multiple different pieces of indication information, it may be considered that data is preferentially received and transmitted according to the information indicated by the in-network UE, so as to ensure mutual discovery of in-network and out-of-network UEs.

It can be understood that because the information indicating whether the first UE is within a network includes two statuses, yes and no, preferably, one bit may be used for indication, so as to reduce signaling overheads. Certainly, it can be understood that indication may also be performed by using multiple bits. This is not specifically limited in this embodiment of the present disclosure.

It should be noted that information that may be included in the first signaling is briefly described above. Certainly, the first signaling may further include another information other than the foregoing listed information. This is not specifically limited in this embodiment of the present disclosure.

Optionally, one item of information or a combination of multiple items of information in the first signaling may be used to implicitly indicate information not included in the first signaling. For example, an association relationship between information that may be included in the first signaling may be established. The first signaling may include only one or more items in the association relationship, and UE used for D2D communication can know another item in the association relationship according to the first signaling and the association relationship.

In an example, an association relationship between the transmission probability and the bandwidth of the D2D link may be established. When the UE used for D2D communication knows one of the transmission probability or the bandwidth of the D2D link, the UE may know the other item of information according to the association relationship. For example, as shown in Table 2, if the transmission probability included in the first signaling is 1, it may be implicitly indicated that the bandwidth of the D2D link is 6 PRB. Alternatively, if the bandwidth of the D2D link included in the first signaling is 6 PRB, it may be implicitly indicated that the transmission probability is 1.

TABLE 2

| Bandwidth value (PRB) | Transmission probability value |
|---|---|
| 6 | 1 |
| 15 | 0.75 |
| 25 | 0.5 |
| 50 | 0.5 |
| 75 | 0.25 |
| 100 | 0.25 |

In another example, similarly, an association relationship between the quantity of retransmission times and the transmit power of the D2D discovery signal may be established. When the UE used for D2D communication knows one of the transmission probability or the bandwidth of the D2D link in the D2D discovery signal, the UE may know the other item of information according to the association relationship. As shown in Table 3, by means of the association relationship, or for example, if the quantity of retransmission times included in the first signaling is 1, it may be indicated according to the quantity of retransmission times that the transmit power is 10 dBm. Alternatively, if the transmit power included in the first signaling is 10 dBm, it may be indicated according to the transmit power that the quantity of retransmission times is 1.

TABLE 3

| Quantity of retransmission times | Transmit power (dBm) |
|---|---|
| 1 | 10 |
| 2 | 16 |
| 3 | 23 |
| 4 | 31 |

In an example, a D2D device (the first UE) may receive the first signaling sent by another D2D device (the third UE), and receive or send data according to the first signaling. The first UE may also transmit the D2D synchronization signal in the D2D link. For example, in FIG. 3, the second UE receives the first signaling from the first UE or may receive or send data according to the first signaling, or receive or send the synchronization signal.

It should be noted that when the first UE performs relay transmission, the first signaling transmitted in UEs with different quantities of forwarding hops may be same or different. For example, when the first UE forwards the first signaling, the first UE may modify the information about the quantity of hops in the first signaling. Situations regarding that when the D2D data or the D2D synchronization signal has one or more hops, the first UE sends the first signaling to the second UE by using the D2D link are provided below.

Situation 1

Figure 4:
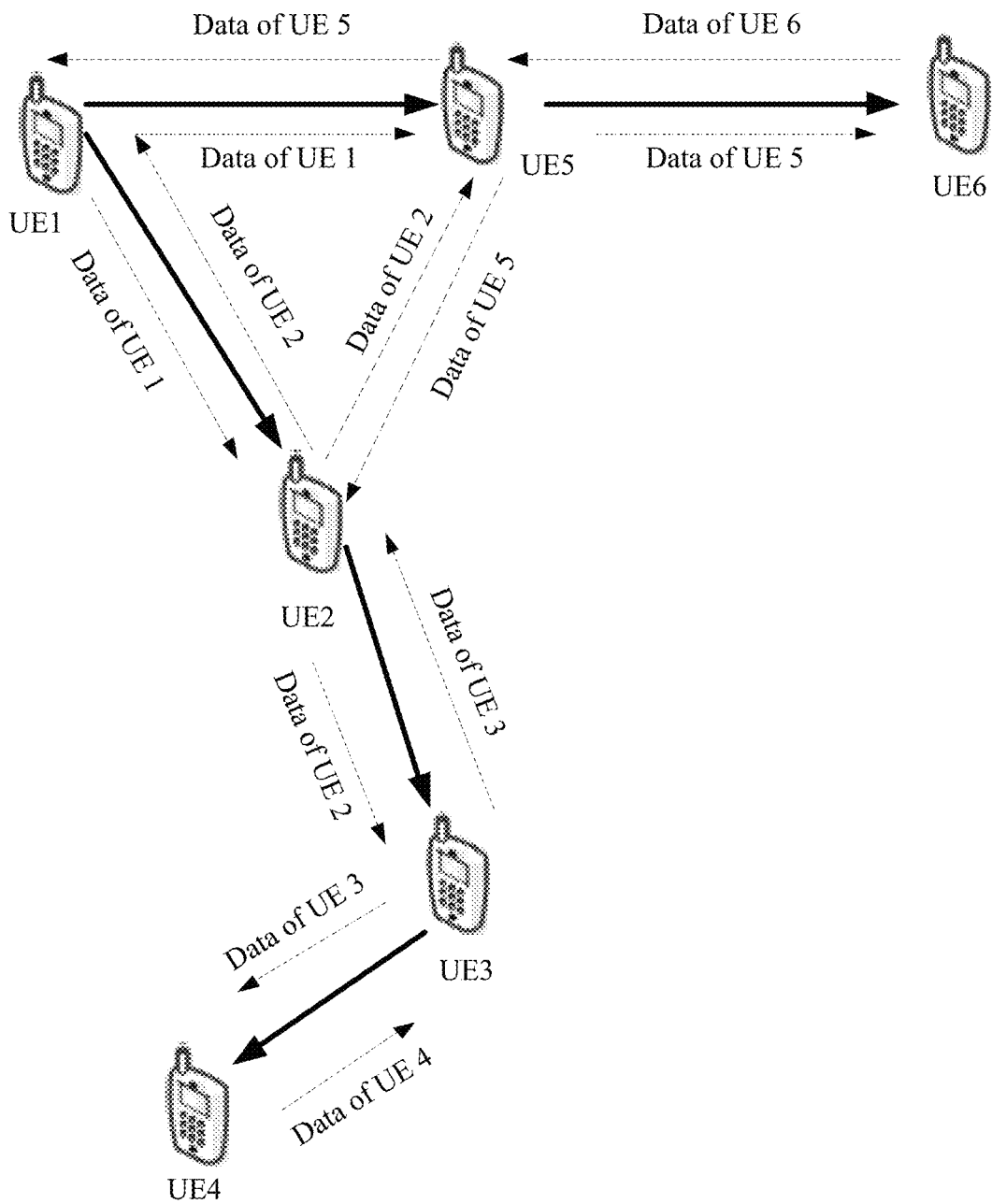
FIG. 4 is a schematic diagram of a D2D link according to an embodiment of the present disclosure.

FIG. 4 shows a multi-hop scenario of the D2D communication mode. In the scenario shown in FIG. 4, the D2D synchronization signal has multiple hops, and the D2D data has only one hop. In FIG. 4, a solid line is used to represent D2D synchronization signal transmission, and a dashed line is used to represent D2D data transmission.

As shown in FIG. 4, data of the UEs is transmitted only between two UEs and is not forwarded by the UE at the receive end. Therefore, the D2D data has only one hop. For example, data of the UE 1 is transmitted only between the UE 1 and the UE 5 or between the UE 1 and the UE 2. Therefore, UEs can only be mutually discovered. For example, the UE 2 can discover the UE 3, the UE 1, and the UE 5, but cannot discover the UE 6 or the UE 4.

In the scenario shown in FIG. 4, the D2D synchronization signal may be transmitted between multiple UEs, and all UEs may use the same D2D synchronization signal. Only quantities of forwarding hops of the D2D synchronization signal are different. For example, assuming that the UE 1 is first UE that sends the D2D synchronization signal, a current quantity of hops at which the first UE is located is 0. The UE 2 and the UE 5 separately receive the D2D synchronization signal of the UE 1 and synchronize with the UE 1. In this case, the quantity of hops of the D2D synchronization signal of the UE 2 and the UE 5 is 1. The UE 2 and the UE 5 separately send the D2D synchronization signal to the UE 3 and the UE 6. In this case, the quantity of hops of the D2D synchronization signal of the UE 3 is 2. Similarly, the quantity of hops of the synchronization signal of the UE 4 is 3. Assuming that a maximum quantity of hops of the D2D synchronization signal is 3, forwarding of the D2D synchronization signal ends at the UE 4, that is, the UE 4 does not send the D2D synchronization signal outwards according to timing of the UE 1.

In an example of the present disclosure, the first signaling is forwarded only between UEs sending the D2D synchronization signal. When forwarding the first signaling, the UE needs to update the information about the current quantity of hops in the first signaling.

In an example, all UEs in FIG. 4 are considered to be within a D2D discovery group. Although D2D data of the UEs has only one hop, by sending the first signaling, mutual interference within the group can still be controlled, and a corresponding transmission resource can be coordinated.

Situation 2

Figure 5:
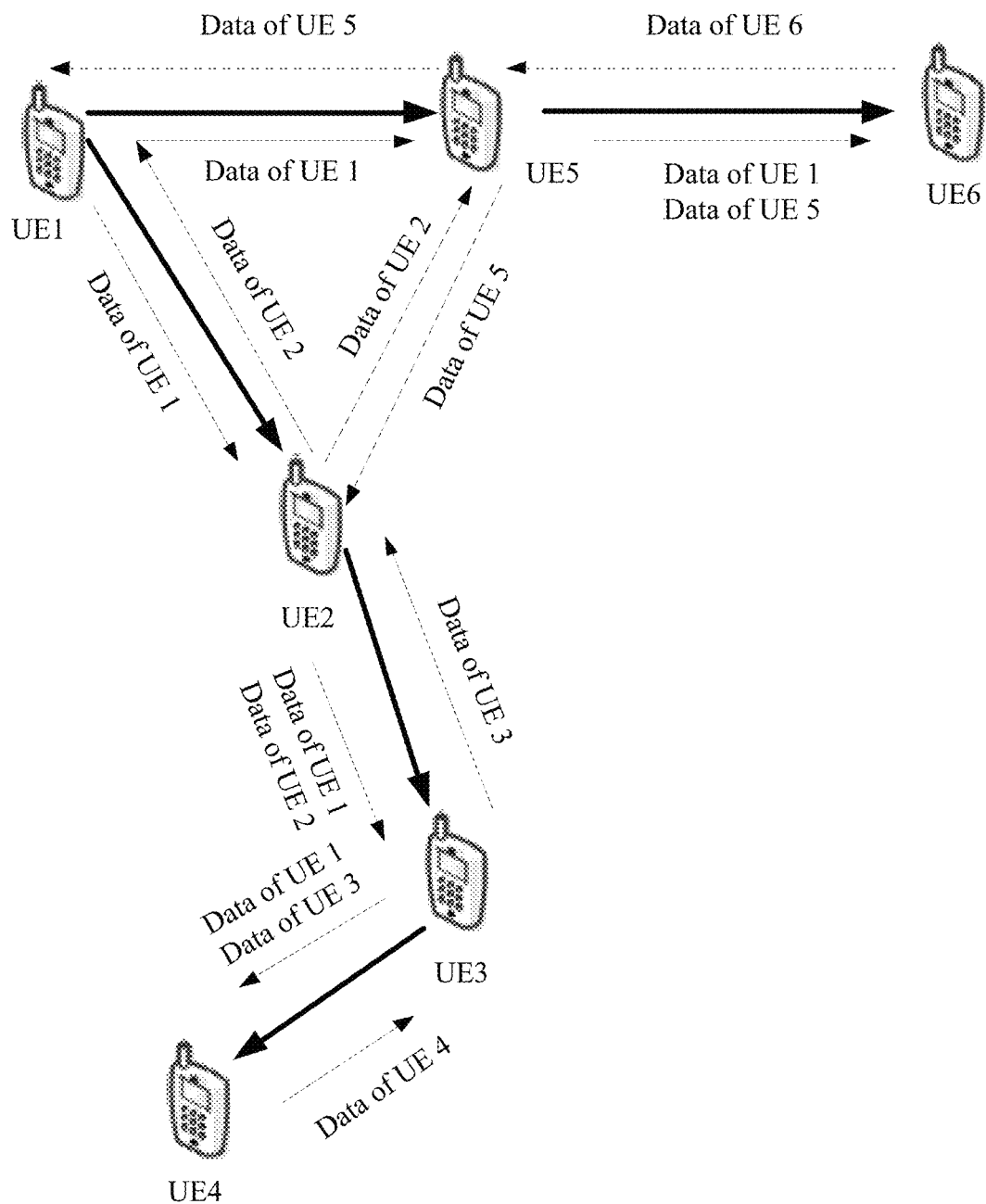
FIG. 5 is a schematic diagram of another D2D link according to an embodiment of the present disclosure.

FIG. 5 shows another multi-hop scenario of the D2D communication mode. In the scenario shown in FIG. 5, the D2D synchronization signal and the D2D data both have multiple hops. In FIG. 5, a solid line is used to represent D2D synchronization signal transmission, and a dashed line is used to represent D2D data transmission.

In the scenario shown in FIG. 5, there are two possible sending manners to send the first signaling. Manner 1: One of the UE sending the D2D data or the UE sending the D2D synchronization signal sends or forwards the first signaling. Manner 2: The UE sending the D2D data and the UE sending the D2D synchronization signal separately send the first signaling. The sent first signaling may be the same or different. In the manner 2, because mechanisms of sending the D2D data or the D2D synchronization signal by different UEs may be different, and the forwarded current quantities of hops may also be different, fields in the first signaling sent by the different UEs may be configured independent of each other. This is not specifically limited in this embodiment of the present disclosure.

In the scenario shown in FIG. 5, because D2D data of the UEs can be forwarded, the UEs are not limited to being only capable of mutually discovering two corresponding parties of D2D communication. For example, the UE 2 can discover the UE 3, the UE 1, and the UE 5. In addition, because the UE 2 forwards data of the UE 1 to the UE 3, the UE 3 can also discover the UE 1. Similarly, the UE 3 further forwards the data of the UE 1 to the UE 4, and the UE 4 can also discover the UE 1. Similarly, the UE 6 can also discover the UE 1 by means of forwarding by the UE 5. In view of the above, in this embodiment, coverage of D2D discovery may be expanded by forwarding the D2D data.

Situation 3

Figure 6:
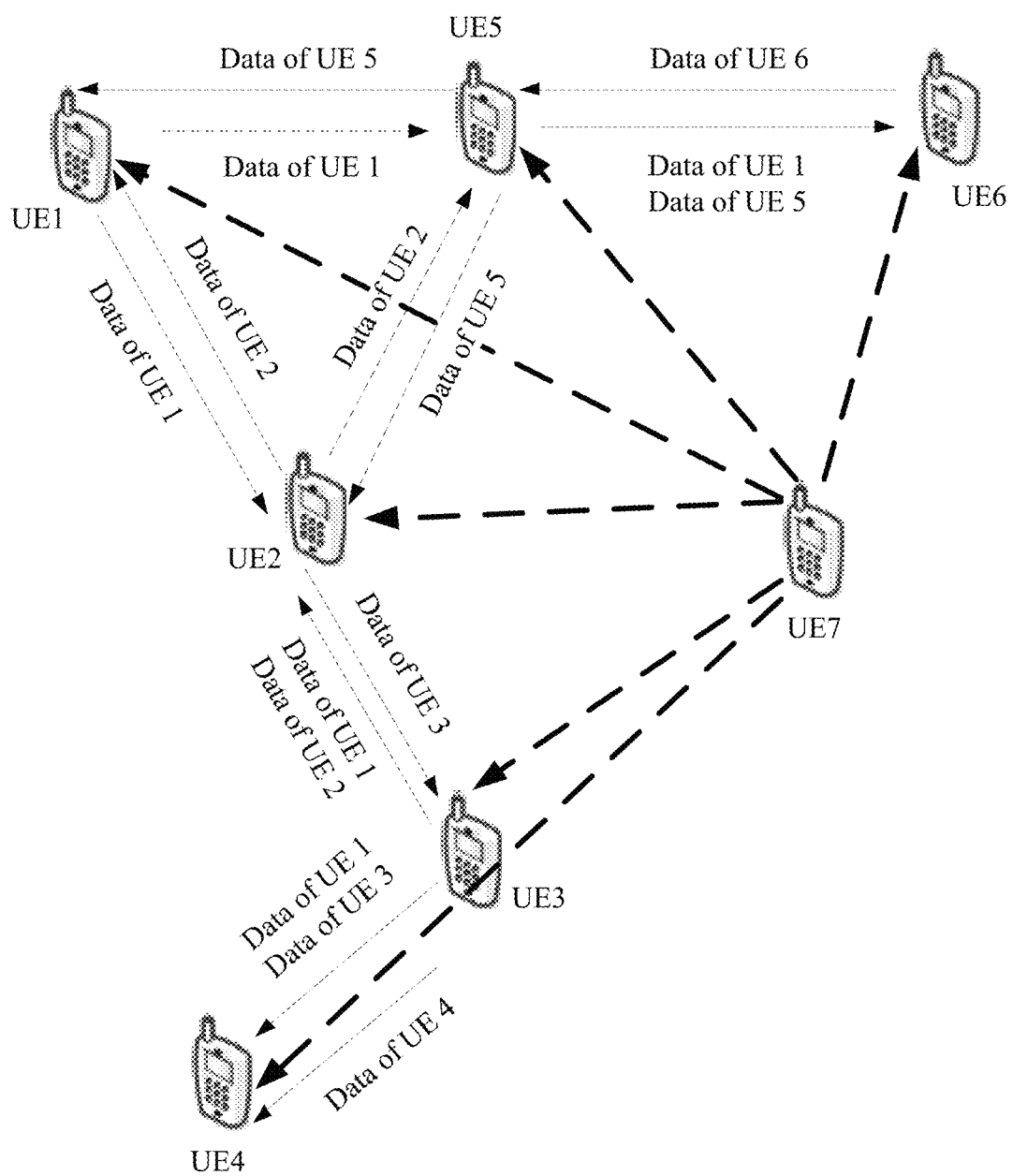
FIG. 6 is a schematic diagram of still another D2D link according to an embodiment of the present disclosure.
Figure 7:
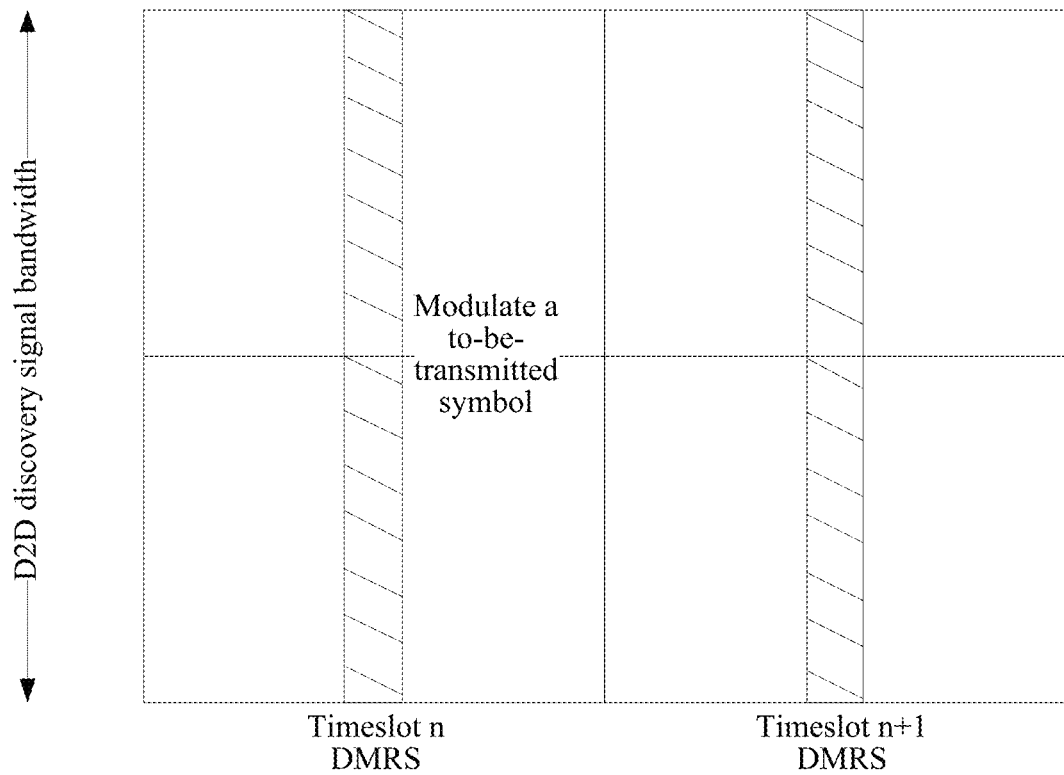
FIG. 7 is a schematic diagram of carrying first signaling by using a DMRS according to an embodiment of the present disclosure.

FIG. 6 shows still another multi-hop scenario of the D2D communication mode. In this scenario, the D2D synchronization signal has only one hop, but the D2D data has multiple hops. A thick dashed line represents a quantity of hops forwarded by the D2D synchronization signal, and a thin dashed line represents a quantity of hops forwarded by the D2D data. UE 7 provides coverage of a one-hop D2D synchronization signal to all UEs in FIG. 6. In this scenario, the UE 7 providing the D2D synchronization signal may have a larger transmit power and greater coverage.

In the scenario shown in FIG. 6, the first signaling may be forwarded between UEs sending the D2D data. When forwarding the first signaling, different UEs sending the D2D data may update the information about the current quantity of hops in the first signaling. For example, a quantity of hops of the UE 1 is 0, a quantity of hops of the UE 2 is 1, and a quantity of hops of the UE 3 is 2. If a predefined maximum quantity of hops is 3, the UE 4 does not forward the D2D data of the UE 1 outwards any longer.

It should be noted that in the foregoing three situations, the UE sending the D2D data and the UE sending the D2D synchronization signal may perform relay transmission. The UE sending the D2D data and the UE sending the D2D synchronization signal may be same UE or may be dedicated UEs separately providing the D2D synchronization signal. This is not specifically limited in this embodiment of the present disclosure.

In a specific implementation process, optionally, the D2D synchronization signal may be used to indicate a channel carrying the first signaling in the D2D link. The D2D synchronization signal includes a primary sidelink synchronization signal (PSSS) and a secondary sidelink synchronization signal (SSSS). Sidelink synchronization signal identities (SLSSID) that correspond to the PSSS and the SSSS are integers not less than 336, and the SLSSIDs are used to identify a channel carrying the first signaling in the D2D link.

In an example, the SLSSID in the prior art may be used. The SLSSID is indicated to the UE receiving the D2D synchronization signal after the UE sending the D2D synchronization signal maps the SLSSIDs to the D2D synchronization signals one by one. Table 4 shows an example of an SLSSID mapping relationship. There are two sequences for generating the PSSS, corresponding root sequence numbers v are respectively 26 and 37, and corresponding identities PSSIDs are 0 and 1. There are 168 secondary synchronization sequences for generating the SSSS, a corresponding identity SSSSID is [0, 167], a value range of the SLSSIDs corresponding to the PSSS and the SSSS is [0, 335], and one D2D synchronization signal uniquely corresponds to one SLSSID.

TABLE 4

| PSSS root sequence number v | PSSSID | SSSSID | SLSSID |
|---|---|---|---|
| 26 | 0 | [0, 167] | [0, 167] |
| 37 | 1 | [0, 167] | [168, 335] |

In another example, the SLSSID of the D2D link is modified by increasing a quantity of the PSSSs or SSSSs. For example:

Table 5 shows another example of an SLSSID mapping relationship list. Compared with the example shown in Table 4, the SSSS remains the same (that is, the value of the SSSSID is still [0, 167]), and the PSSS is expanded (for example, a PSSS is added). The SLSSIDs that correspond to the PSSS and the SSSS are separately mapped to [336, 503] one by one.

TABLE 5

| PSSS root sequence number v | PSSSID | SSSSID | SLSSID |
|---|---|---|---|
| v2 | 2 | [0, 167] | [336, 503] |

It should be noted that the root sequence number v2 corresponding to the sequence for generating the PSSS is a sequence number different from existing root sequence numbers 26 and 37. For example, the root sequence number v2 may be one of the following values: 22, 23, 40, or 41. Certainly, more root sequences v may be used to expand the PSSS sequence, so as to expand available SLSSIDs. This is not specifically limited in this embodiment of the present disclosure.

Table 6 shows still another example of an SLSSID mapping relationship list. Compared with the example shown in Table 4, the PSSS remains the same, and the SSSS is expanded (for example, a new SSSS is added). The SLSSIDs that correspond to the PSSS and the SSSS are separately mapped to [336, 671] one by one.

TABLE 6

| PSSS root sequence number u | PSSSID | SSSSID | SLSSID |
|---|---|---|---|
| 26 | 0 | [168, 335] | [336, 503] |
| 37 | 1 | [168, 335] | [504, 671] |

It can be understood that ranges of the expanded SSSS and the SSSSID corresponding to the SSSS may not be limited to values provided in Table 6. This is not specifically limited in this embodiment of the present disclosure.

Because generation of a scrambling sequence and a demodulation reference signal (DMRS) sequence of a dedicated control channel carrying the first signaling is related to the SLSSIDs, the dedicated control channel carrying the first signaling in this embodiment of the present disclosure may be distinguished or uniquely identified by separately mapping the SLSSIDs of the D2D link to integers not less than 336 one by one.

In an example, in the foregoing S304, the first UE may send the first signaling to the second UE by using a dedicated control channel in the D2D link.

In D2D characteristics of the 3rd Generation Partnership Project (3GPP) protocol release (Rel) 12, a physical sidelink broadcast channel (PSBCH) is defined. In an example of the present disclosure, a reserved field in an existing PSBCH channel may be used, to carry the first signaling. This is equivalent to defining a new dedicated control channel. That is, the dedicated control channel includes the reserved field, and some or all bits in the reserved field are used to carry the first signaling. For example, some of bits in the existing PSBCH channel are used as reserved fields, and a total quantity of bits of the reserved fields is 27. Therefore, some or all bits in these reserved fields may be used to indicate the first signaling. For example, four bits are used to separately indicate the quantity of retransmission times (such as two bits) and the transmission probability (such as two bits). Positions of the four bits may be the front, the middle, or the end of the reserved field. This is not specifically limited in this embodiment of the present disclosure.

In another example of the present disclosure, the dedicated control channel may also be a channel that uses a time frequency resource different from that of the PSBCH or a channel in which carried content and/or a transmission manner is different from that of the PSBCH. This is not limited in the present disclosure.

In a specific implementation process, that the dedicated control channel is used to carry the first signaling may be identified in multiple manners.

In a possible implementation, the dedicated control channel may further carry second signaling, and the second signaling is used to identify that the dedicated control channel is a channel carrying the first signaling.

For example, when the first signaling is transmitted in an independent dedicated control channel, the second signaling may be carried in the dedicated control channel. The second signaling is used to identify that the dedicated control channel is a channel carrying the first signaling. Preferably, the second signaling may be indicated by using one bit. The one bit may be a bit in an actual status, for example, one added bit. When a value of the bit is 1, it represents that the dedicated control channel is the dedicated control channel carrying the first signaling. Otherwise, the dedicated control channel is not the dedicated control channel carrying the first signaling. Alternatively, the one bit does not have any actual physical meaning and may not be filled with a value or be filled with only a fixed value (such as 0 or 1), to achieve an objective of making a length of the dedicated control channel carrying the first signaling not equal to a length of the PSBCH defined in the D2D characteristics of the 3GPP protocol Rel-12.

In a possible implementation, the dedicated control channel may carry a DMRS, the DMRS is used to identify that the dedicated control channel is a channel carrying the first signaling, and a generation parameter u corresponding to the DMRS satisfies:

$$u=(f_{gh}(n_s)+f_{ss}) \bmod 30+b, \text{ where}$$

$n_s$ is a non-negative integer and represents a timeslot number or a subframe number, $f_{gh}(n_s)$ is an integer and represents a sequence group hop, $f_{ss}$ is an integer and represents a sequence hop, mod represents a modulo operation, and b is a non-zero integer.

Specifically, in the prior art, when a root sequence of the DMRS of the PSBCH defined in the D2D characteristics of the 3GPP protocol Rel-12 is selected, a mechanism is the same as that in LTE, and only the sequence group hop and the sequence hop of a DMRS generation sequence are closed.

For the parameter $u=(f_{gh}(n_s)+f_{ss})\mod 30$ generating the DMRS, when the sequence group hop is closed, $f_{gh}(n_s)=0$. When the sequence hop is closed, $f_{ss}=\text{SLSSID} \mod 30$.

In this implementation of this embodiment of the present disclosure, in the parameter $u=(f_{gh}(n_s)+f_{ss}) \mod 30+b$ generating the DMRS, b is a non-zero integer.

Alternatively, if the sequence group hop is not closed, $f_{gh}(n_s) \ne 0$.

Alternatively, if the sequence hop is not closed, $f_{ss}=((\text{SLSSID} \mod 30)+\Delta)\mod 30$.

In this way, a generated DMRS carried by the dedicated control channel is different from a generated DMRS carried by the PSBCH channel, so that the dedicated control channel is different from the PSBCH defined in the D2D characteristics of the 3GPP protocol Rel-12.

Further, $f_{ss}$ in the generation parameter $u=(f_{gh}(n_s)+f_{ss}) \mod 30$ corresponding to the DMRS satisfies: $f_{ss}=((\text{SLSSID} \mod 30)+\Delta)\mod 30$, where the SLSSID is an integer not less than 0, and $\Delta$ is a non-zero constant.

That is, the SLSSID may be an SLSSID (that is, [0, 335]) in an existing D2D link or may be a remapped SLSSID (that is, an integer not less than 336) in the D2D link in the foregoing embodiment. This is not specifically limited in this embodiment of the present disclosure.

In a possible implementation, the dedicated control channel is scrambled by using a scrambling sequence when being generated, the scrambling sequence is used to identify that the dedicated control channel is a channel carrying the first signaling, and an initial value $c_{init}$ used when the scrambling sequence is generated satisfies:

$c_{init}=\text{nSLSSID}$ or $c_{init}=n_{RNTI}*2^{14}+q*2^{13}+\lfloor n_s/2 \rfloor*2^9+\text{SLSSID}$, where $n_{RNTI}$, q, and $n_s$ are all non-zero integers, SLSSID is an integer not less than 0, and nSLSSID is an integer not less than 336.

That is, the SLSSID may be an SLSSID (that is, [0, 335]) in an existing D2D link or may be a remapped SLSSID (that is, an integer not less than 336) in the D2D link in the foregoing embodiment. This is not specifically limited in this embodiment of the present disclosure. The nSLSSID is a remapped SLSSID (that is, an integer not less than 336) in the D2D link in the foregoing embodiment.

Specifically, in the PSBCH defined in the D2D characteristics of the existing 3GPP protocol Rel-12, an initial value formula when the scrambling sequence is generated is: $c_{init}=\text{SLSSID}$, where SLSSID is an integer between [0, 335]. In this embodiment of the present disclosure, in the dedicated control channel carrying the first signaling, the initial value formula $c_{init}$ when the scrambling sequence is generated satisfies: $c_{init}=\text{nSLSSID}$, or $c_{init}=n_{RNTI}*2^{14}+q*2^{13}+\lfloor n_s/2 \rfloor*2^9+\text{SLSSID}$, where nSLSSID is an integer not less than 336. Therefore, the initial value of the scrambling sequence used when the dedicated control channel carrying the first signaling is generated is different from an initial value of a scrambling sequence used when the PSBCH defined in the D2D characteristics of the 3GPP protocol Rel-12 is generated, so that the dedicated control channel carrying the first signaling is different from the PSBCH defined in the D2D characteristics of the 3GPP protocol Rel-12.

In a possible implementation, the dedicated control channel uses a cyclic redundancy check (CRC) mask when being generated, and the CRC mask is used to identify that the dedicated control channel is a channel carrying the first signaling.

Specifically, in the PSBCH defined in the D2D characteristics of the existing 3GPP protocol Rel-12, 16-bit CRC is used, and a CRC mask is not used, or a default CRC mask is all 0. The CRC mask refers to adding a predefined bit sequence of 0 and 1 that has a length the same as a CRC length to a CRC field after coding. If there is no CRC mask, during decoding, CRC is directly performed on an information bit obtained by decoding. If a CRC result is correct, a whole process of receiving, demodulation, and decoding of this data packet is considered to be correct. Otherwise, the process is considered to be incorrect.

If the CRC mask is added to CRC, before CRC is performed, the CRC mask needs to be removed first, and then CRC is performed. In this way, an obtained result is an expected check result. Otherwise, CRC is basically incorrect. In this embodiment of the present disclosure, when being generated, the dedicated control channel uses the CRC mask, and the CRC mask is used to identify that the dedicated control channel is a channel carrying the first signaling. That is, whether the channel is the PSBCH defined in the D2D characteristics of the 3GPP protocol Rel-12 or the dedicated control channel carrying the first signaling may be distinguished by using the CRC mask.

For example, a bit string with a length of 16 bits, for example, 1111111111111111, 1100110011001100, or 1001100110011001, may be used as the CRC mask. It can be understood that it is feasible as long as the CRC mask is not an all-0 bit string. Bit strings are not listed one by one herein in this embodiment of the present disclosure.

In another example, in the foregoing S304, the first UE may also send the first signaling to the second UE by using a non-control channel in the D2D link. For example, the first signaling may be carried in one or a combination of the following manners: the CRC mask, the D2D synchronization signal, or the DMRS. This is described in detail below.

(a) CRC Mask

Specifically, using an LTE system as an example, the D2D discovery signal occupies two physical resource blocks (PRBs). A data packet has a fixed size and includes 24-bit CRC, 232 bits in total. The first signaling may be carried by using the CRC mask. For example, 2-bit information in the first signaling may be carried by using four different CRC masks. For another example, 3-bit information in the first signaling may be carried by using eight different CRC masks.

Table 7 provides an example of a mapping relationship between a 24-bit CRC mask and an information status in the first signaling. It is assumed that the information status is of two bits. For example, the quantity of retransmission times is indicated by using two bits. If the CRC mask is 111100001111000011110000, it can be known from Table 7 that the first signaling carried by the CRC mask indicates that the quantity of retransmission times is 3 (the corresponding 2-bit information status is 10).

TABLE 7

| 24-bit CRC mask | Information status |
|---|---|
| 000011110000111100001111 | 00 |
| 000000000000111111111111 | 01 |

TABLE 7-continued

| 24-bit CRC mask | Information status |
| --- | --- |
| 111100001111000011110000 | 10 |
| 111111111111000000000000 | 11 |

It should be noted that a mapping relationship between a CRC mask and an information status in the first signaling is provided only as an example. Certainly, other mapping relationships may also exist. The mapping relationships are not listed one by one herein in this embodiment of the present disclosure.

(b) D2D Synchronization Signal

Specifically, when the first signaling is carried by the D2D synchronization signal, different sequences of the D2D synchronization signal are divided into M subgroups, and the M subgroups are used to carry information not exceeding n=floor($\log_2$ (M)) bits, where a floor function represents rounding down to the nearest integer.

For example, assuming that 168 sequences of the D2D synchronization signal are divided into eight subgroups in total, 3-bit information in the first signaling may be carried by using the D2D synchronization signal, and each subgroup includes 21 sequences. A grouping method may be numbering one by one starting from sequences, as shown in Table 8.

It is assumed that the corresponding information status is of three bits. An information status of two lower bits corresponds to the quantity of retransmission times, and an information status of one upper bit corresponds to information indicating whether the first UE is within a network. When the information indicating whether the first UE is within a network is "1", it indicates that the first UE is within a network. When the information indicating whether the first UE is within a network is "0", it indicates that the first UE is out of a network. If a sequence index of the D2D synchronization signal is 45, it can be known from Table 8 that the first signaling carried by the D2D synchronization information indicates that the quantity of retransmission times is 3 (two corresponding lower bits on the right are 10), and the first UE is out of a network (a corresponding highest bit on the left is 0).

TABLE 8

| Sequence index of D2D synchronization signal | Information status |
| --- | --- |
| 0-20 | 000 |
| 21-41 | 001 |
| 42-62 | 010 |
| 63-83 | 011 |
| 84-104 | 100 |
| 105-125 | 101 |
| 126-146 | 110 |
| 147-167 | 111 |

It should be noted that a grouping mapping relationship between different sequences of the D2D synchronization signal is provided only as an example. Certainly, other grouping mapping relationships may also exist. The mapping relationships are not listed one by one herein in this embodiment of the present disclosure.

(c) DMRS

Specifically, using an LTE system as an example, the D2D discovery signal occupies two PRBs, and a corresponding length on a frequency domain is of 24 subcarriers, and a length of a corresponding DMRS is 24. When the first signaling is carried by the DMRS, the first signaling is carried by cyclic shifts of different DMRSs in the D2D link. Alternatively, the first signaling is carried by a modulation symbol on either of two neighboring DMRSs in the D2D link. Alternatively, the first signaling is carried by modulation symbols on two neighboring DMRSs in the D2D link.

The foregoing three manners of carrying, by the DMRS, the first signaling are briefly described below separately.

Manner 1: The first signaling is carried by cyclic shifts of different DMRSs in the D2D link.

Specifically, the cyclic shift is generated by rotating a sequence corresponding to the DMRS used on a frequency domain by one phase, as follows:

$r^{(\alpha)}(n)=e^{j\alpha n}r(n), 0 \leq n < M$, where

α represents a phase value corresponding to the cyclic shift, r(n) represents a sequence before the cyclic shift, and a length of the sequence is M.

For example, the DMRS may have eight different cyclic shift values and correspond to a 3-bit status, and may be used to carry 3-bit information in the first signaling. Different cyclic shift values correspond to different information statuses and are not listed one by one herein.

Manner 2: The first signaling is carried by a modulation symbol on either of two neighboring DMRSs in the D2D link.

Specifically, an interval between two neighboring DMRSs in a time domain is 0.5 ms. A modulation symbol may be sent on one of two neighboring DMRSs, so that the modulation symbol carries the first signaling. For example, a quaternary phase shift keying (QPSK) symbol can indicate 2-bit information. A 16 quadrature amplitude modulation (QAM) symbol can indicate 4-bit information. A 64 QAM symbol can indicate 6-bit information.

As shown in FIG. 11, FIG. 11 shows a DMRS that is of a D2D discovery signal and that is used to transmit a modulation symbol. The modulation symbol may be mapped to any one of neighboring DMRSs in a subframe, and a modulation may be performed in a direct spreading manner. That is, assuming that DMRS representation chips in a timeslot n are: d1, d2, . . . , and dL, and a to-be-modulated QAM symbol is x, the DMRS chips in the timeslot n after symbol modulation become: d1*x, d2*x, . . . , and dL*x.

Manner 3: The first signaling is carried by modulation symbols on two neighboring DMRSs in the D2D link.

In FIG. 11, assuming that DMRS representation chips in a timeslot n are: d1, d2, . . . , and dL, and a to-be-modulated QAM symbol is x, the symbol x may also be simultaneously placed on different chips of two neighboring DMRSs. For example, the symbol x is placed on different chips of the timeslot n and a timeslot n+1 at equal intervals. The timeslot n is: d1, d2*x, d3, d4*x, . . . , d(L−1), and dL*x.

The timeslot n+1 is: d1*x, d2, d3*x, d4, . . . , d(L−1)*x, and dL.

It should be noted that in the foregoing manner 2 and manner 3, after receiving the first signaling sent by the first UE, the second UE may demodulate, by using two neighboring DMRSs, the symbol that carries x after modulation. This is not specifically limited in this embodiment of the present disclosure.

It should be noted that the carrying manner of the non-control channel is only briefly described above. Certainly, in addition to the foregoing listed carrying manner of the non-control channel, other carrying manners of the non-control channel may exist. In addition, a single carrying manner of the non-control channel is only provided above. Certainly, there may also be a combination of multiple carrying manners of the non-control channel, such as carrying of the CRC mask and carrying of the D2D synchronization signal. This is not specifically limited in this embodiment of the present disclosure.

It can be understood that carrying the first signaling by using the non-control channel may not increase extra system overheads. Therefore, system resources are saved.

Optionally, the first UE shown in FIG. 3 may be in-network UE, and the first UE satisfies at least one of a condition A or a condition B:

Condition A: Quality of a signal that is received by the first UE and that is from the base station is less than a first threshold.

Condition B: Quality of a signal that is received by the first UE and that is from out-of-network UE is greater than a second threshold.

When the first UE detects that the UE satisfies the condition A, it indicates that the first UE is at an edge position of a coverage area of the base station. In this case, the first UE may limit some user equipments to forward the first signaling of the first UE, so as to limit a quantity of participating UEs and improve signaling transmission efficiency.

When the first UE detects that the UE satisfies the condition B, it indicates that the first UE detects an out-of-network D2D signal, and the first UE may trigger to send the first signaling according to this event.

When the first UE detects that the UE satisfies both the condition A and the condition B, the UE is triggered to send the first signaling, and a quantity of UEs forwarding the first signaling is limited, so as to ensure that only a few or specific UEs send the first signaling and serve the out-of-network UE as much as possible.

The quality of the signal that is received by the first UE and that is from the out-of-network UE in the condition B may be signal quality of the D2D discovery signal that is detected by the first UE and that is from the out-of-network UE, or may be signal quality of the D2D synchronization signal that is detected by the first UE and that is from the out-of-network UE; and/or the quality of the signal that is received by the first UE and that is from the out-of-network UE in the condition B may be signal quality of a reference signal that is on an out-of-network D2D control channel and/or a control channel and that is measured by the first UE; and/or the quality of the signal that is received by the first UE and that is from the out-of-network UE in the condition B may be signal quality of a reference signal that is on a data packet of the D2D discovery signal and/or the D2D discovery signal and that is measured by the first UE. This is not specifically limited in this embodiment of the present disclosure.

The foregoing determining condition may be not only applicable to a scenario in which the first UE has a radio resource control (RRC) connection but also applicable to a scenario in which the first UE has no RRC connection.

Optionally, the first UE shown in FIG. 3 may also be out-of-network UE, and the first UE satisfies a condition C:
Condition C: quality of a signal that is received by the first UE and that is from another UE is less than a third threshold.

The quality of the signal that is received by the first UE and that is from another UE in the condition C may be signal quality of the D2D discovery signal that is detected by the first UE and that is from the in-network or out-of-network UE, or may be signal quality of the D2D synchronization signal that is detected by the first UE and that is from the out-of-network UE; and/or the quality of the signal that is received by the first UE and that is from another UE in the condition C may be signal quality of a reference signal that is on an out-of-network D2D control channel and/or a control channel and that is measured by the first UE; and/or the quality of the signal that is received by the first UE and that is from another UE in the condition C may be signal quality of a reference signal that is on a data packet of the D2D discovery signal and/or the D2D discovery signal from the in-network or out-of-network UE and that is detected by the first UE. This is not specifically limited in this embodiment of the present disclosure.

It should be noted that the condition C is applicable to a scenario of no network. In this case, if the first UE detects that signal strength of another UE is less than the third threshold, it indicates that necessary coverage of the D2D signal lacks around the first UE. Therefore, the first UE may send D2D related signaling, including the first signaling in this embodiment of the present disclosure.

The signal quality may include: a reference signal received power (RSRP), received signal strength indication (RSSI), reference signal received quality (RSRQ), a signal to interference plus noise ratio (SINR), and the like. This is not specifically limited in this embodiment of the present disclosure.

The first threshold, the second threshold, or the third threshold may be predefined or may be configured for the first UE by a network by using signaling. This is not specifically limited in this embodiment of the present disclosure.

In an example, the first signaling not only may be used for D2D discovery but also may be used for D2D communication. Functions of parameters when the first signaling is used for D2D communication are briefly described below.

Information such as the bandwidth of the D2D link, the D2D link frame number, the TDD uplink and downlink configuration information, and information indicating whether the first UE is within a network is information necessary for indicating D2D communication and is information that needs to be mutually confirmed to implement data transmission between the transmitter and the receiver in a D2D communication process.

Information about the quantity of antenna ports and the transmission mode is signaling that is necessarily indicated after nonlinear transmission and MIMO transmission are introduced into D2D communication. Otherwise, multi-antenna and nonlinear transmission cannot be supported.

The current quantity of hops refers to information that needs to be indicated when relay transmission supporting multiple hops is introduced between D2D communication devices. With information about the current quantity of hops, when a data packet from UE is forwarded to the second UE by different first UEs at different quantities of hops, the second UE may select to receive the data packet or combine the data packet according to the information about the current quantity of hops.

Information such as the transmission probability, the quantity of retransmission times, the transmission period, the CP type, and the transmit power may be used to optimize transmission of D2D communication, for example, controlling use intensity of resources, reducing a quantity of blind detection times, and reducing unnecessary interference between multiple groups of users.

When the first signaling is used for D2D communication, the first signaling may be used to enhance D2D communication. For example, at least one of the following aspects may be enhanced: Nonlinear transmission and multi-antenna MIMO transmission are introduced by indicating information about the quantity of antenna ports and the transmission mode; a configurable mechanism of the quantity of retransmission times is introduced by indicating information about the quantity of retransmission times; control over use intensity of resources is optimized by indicating information about the transmission probability; transmit powers of nodes are optimized by indicating information about the transmit power; D2D communication is expanded to a relay mode supporting multiple hops by indicating information about the current quantity of hops; or blind detection of the receiver is reduced by indicating the CP type, so as to reduce unnecessary calculation and power consumption.

When the first signaling is used for D2D communication, refer to the signaling transmission method in the foregoing D2D discovery process for a signaling transmission method. The transmission methods are not described herein in this embodiment of the present disclosure.

In the solution provided in this embodiment of the present disclosure, a D2D device (such as first UE) sends first signaling to another D2D device (such as second UE) by using a D2D link, so that different D2D devices can receive and transmit data by using same parameters in a same resource pool (a set of user resources) when sending a D2D discovery signal, so as to implement D2D discovery between partially covered or out-of-network covered user equipments. On the other hand, a D2D device (such as the first UE) sends first signaling to another D2D device (such as the second UE), so that a format of the D2D discovery signal may be limited and unified, so as to adjust transmission among multiple UEs, reducing mutual conflict and interference in a D2D discovery process and improving transmission efficiency.

An embodiment of the present disclosure further provides a user equipment (UE), including corresponding modules configured to perform behaviors of the first UE in the foregoing method designs. The modules may be software and/or hardware.

Figure 8:
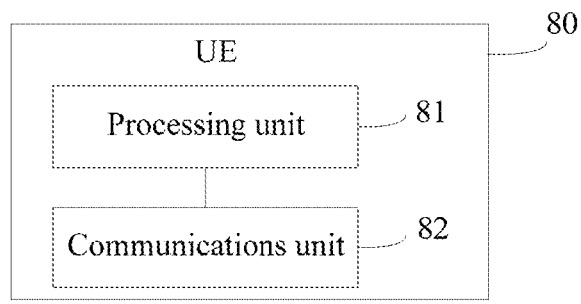
FIG. 8 is a schematic structural diagram of UE according to an embodiment of the present disclosure.

FIG. 8 shows a design block diagram of a user equipment (UE) involved in the foregoing embodiments. The UE 80 may be used as the first UE or the second UE in the foregoing embodiments. The UE 80 includes: a processing unit 81 and a communications unit 82. The processing unit 81 is configured to control and manage actions of the UE and is configured to perform processing performed by the first UE or the second UE in the foregoing embodiments. For example, the processing unit 81 is configured to determine first signaling used for D2D discovery. The communications unit 82 is configured to support communication between the UE 80 and another network element. For example, the communications unit 82 is configured to communicate with another UE or a base station and send and/or receive data. Refer to description in the foregoing embodiments for the first signaling and the actions of the UE. The first signaling and the actions of the UE are not described herein.

Figure 9:
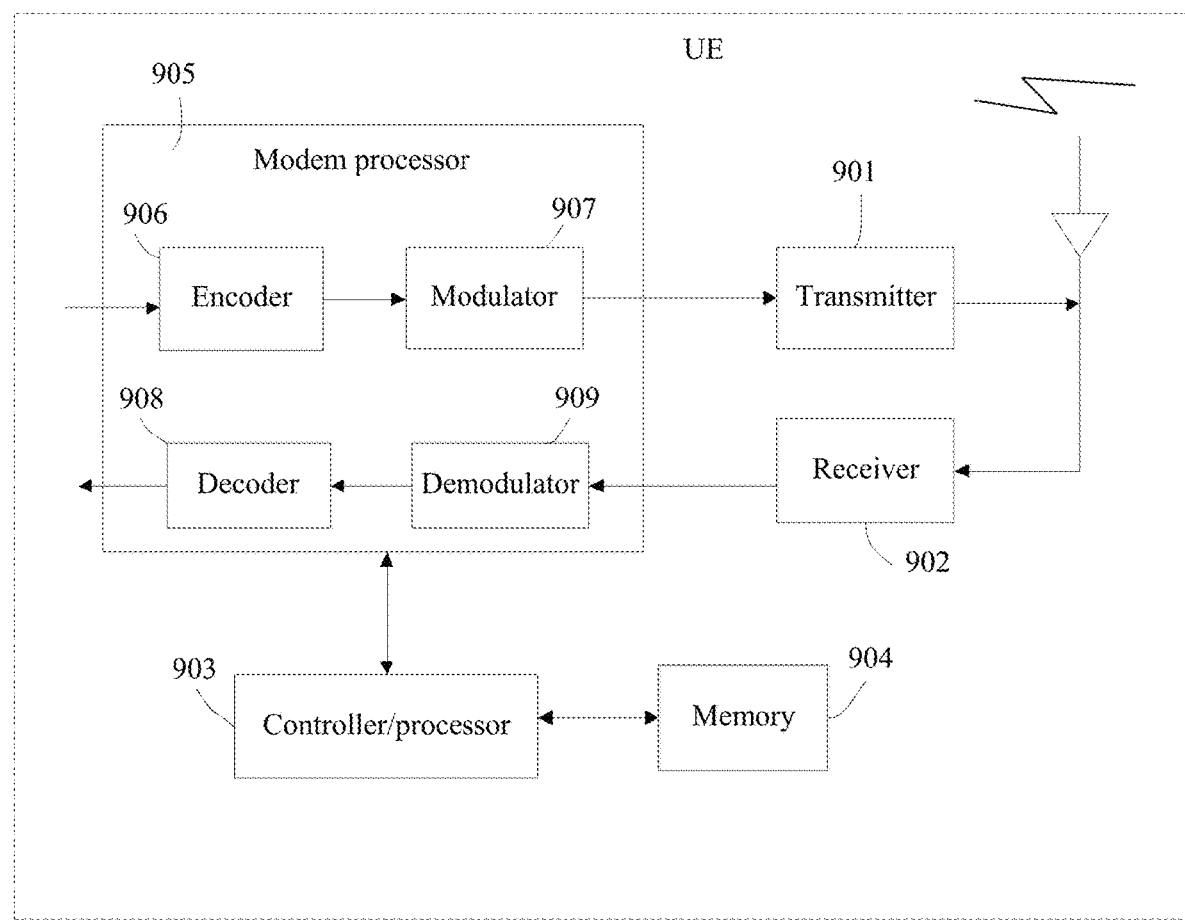
FIG. 9 is a schematic structural diagram of another UE according to an embodiment of the present disclosure.

FIG. 9 shows another design block diagram of a user equipment (UE) involved in the foregoing embodiments.

An encoder 906 receives service data and a signaling message to be sent on an uplink. The encoder 906 processes (for example, formatting, encoding, and interleaving) the service data and the signaling message. A modulator 907 further processes (for example, symbol mapping and modulation) the encoded service data and signaling message and provides output sampling. A transmitter 901 adjusts (for example, analog conversion, filtering, amplification, and up-conversion) the output sampling and generates an uplink signal or a D2D link signal. The uplink signal is transmitted to the base station or the D2D device (such as the second UE) in the foregoing embodiments by using an antenna. The antenna receives a downlink signal transmitted by the base station and a D2D link signal from another D2D device in the foregoing embodiments. A receiver 902 adjusts (for example, filtering, amplification, down-conversion, and digitization) a signal received from the antenna and provides input sampling. A demodulator 909 processes (for example, demodulation) the input sampling and provides symbol estimation. A decoder 908 processes (for example, de-interleaving and decoding) the symbol estimation and provides the decoded data and signaling message sent to the UE. The encoder 906, the modulator 907, the demodulator 909, and the decoder 908 may be implemented by a modem processor 905. These units perform processing according to a radio access technology (for example, LTE and access technologies of other evolved systems, such as a D2D communication technology) used by a radio access network.

A controller/processor 903 controls and manages the actions of the UE and is configured to perform processing performed by the UE in the foregoing embodiments. For example, the controller/processor 903 is configured to control the UE to determine to-be-sent first signaling and/or another process of a technology described in the present disclosure. In an example, the controller/processor 903 is configured to support the UE to perform the processes S302 and S304 in FIG. 3. A memory 904 is configured to store program code and data used for the UE.

The controller/processor for performing functions of the UE in the present disclosure may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor can implement or perform various examples of logic blocks, modules, and circuits described with reference to content disclosed in the present disclosure. The processor may also be a combination that implements a calculation function, for example, including one microprocessor or a combination of multiple microprocessors, or a combination of a DSP and a microprocessor.

Steps of the method or algorithm described with reference to content disclosed in the present disclosure may be directly embodied as hardware, software modules executed by the processor, or a combination of the hardware and the software modules. The software modules may be located in a RAM memory, a flash memory, a ROM memory, an EPROM memory, an EEPROM memory, a register, a hard disk, a removable hard disk, a CD-ROM or a storage medium of any other form well known in the art. An example of a storage medium is coupled to the processor, so that the processor can read information from the storage medium and can write information to the storage medium. Certainly, the storage medium may also be a component of the processor. The processor and the storage medium may be located in an ASIC. In addition, the ASIC may be located in the user equipment. Certainly, the processor and the storage medium may also exist in the user equipment as discrete components.

A person skilled in the art should realize that in the foregoing one or more examples, functions described in the present disclosure can be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A device to device (D2D) communication method, the method comprising:
    determining, by a first user equipment (UE), first signaling to be sent, wherein the first signaling is used for subsequent sending or receiving of at least one of D2D discovery and D2D communication, wherein the first signaling comprises a current quantity of hops; and
    sending, by the first UE, the first signaling to a second UE using the D2D link, wherein the first signaling is carried by a D2D synchronization signal, wherein different sequences of the D2D synchronization signal are divided into M subgroups, and the M subgroups are used to carry information not exceeding n=floor($\log_2$(M)) bits, wherein a floor function represents rounding down to the nearest integer.

2. The method according to claim 1, wherein the determining, by the first UE, the first signaling comprises:
    determining, by the first UE, the first signaling according to preconfigured information; or
    receiving, by the first UE, a signaling that is sent by a third UE using the D2D link, and determining the first signaling according to the signaling sent by the third UE; or
    receiving, by the first UE, signaling sent by a network device, and determining the first signaling according to the signaling sent by the network device.

3. The method according to claim 1, wherein the information comprised in the first signaling is further used to implicitly indicate second information of comprised in the first signaling.

4. The method according to claim 1,
    wherein the D2D synchronization signal comprises a primary sidelink synchronization signal (PSSS) and a secondary sidelink synchronization signal (SSSS), wherein sidelink synchronization signal identities (SLSSIDs) that correspond to the PSSS and the SSSS are integers not less than 336, and the SLSSIDs are used to identify a channel carrying the first signaling.

5. The method according to claim 1, wherein the sending, by the first UE, the first signaling to the second UE using the D2D link comprises:
    sending, by the first UE, the first signaling to the second UE using a dedicated control channel in the D2D link.

6. The method according to claim 5, wherein the dedicated control channel comprises a reserved field, and some or all bits in the reserved field are used to carry the first signaling.

7. The method according to claim 5, wherein the dedicated control channel further carries second signaling, and the second signaling is used to identify that the dedicated control channel is a channel carrying the first signaling.

8. The method according to claim 5, wherein the dedicated control channel further carries a demodulation reference signal (DMRS), wherein the DMRS is used to identify that the dedicated control channel is a channel carrying the first signaling, and a generation parameter u corresponding to the DMRS satisfies:

$$u=(f_{gh}(n_s)+f_{ss}) \bmod 30+b,$$

wherein $n_s$ is a non-negative integer and represents a timeslot number or a subframe number, $f_{gh}(n_s)$ is an integer and represents a sequence group hop, $f_{ss}$ is an integer and represents a sequence hop, mod represents a modulo operation, and b is a non-zero integer.

9. The method according to claim 8, wherein $f_{ss}$ satisfies:

$$f_{ss}=((\text{SLSSID} \bmod 30)+\Delta) \bmod 30,$$

wherein SLSSID is an integer not less than 0, and $\Delta$ is a non-zero constant.

10. The method according to claim 5, wherein the dedicated control channel is scrambled by using a scrambling sequence when being generated, wherein the scrambling sequence is used to identify that the dedicated control channel is a channel carrying the first signaling, and an initial value $c_{init}$ used when the scrambling sequence is generated satisfies:

$$c_{init}=n\text{SLSSID or } c_{init}=n_{RNTI}*2^{14}+q*2^{13}+\lfloor n_s/2 \rfloor *2^9+\text{SLSSID},$$

wherein $n_{RNTI}$, q, and $n_s$ are all non-zero integers, SLSSID is an integer not less than 0, and nSLSSID is an integer not less than 336.

11. The method according to claim 5, wherein the dedicated control channel uses a cyclic redundancy check (CRC) mask when being generated, and the CRC mask is used to identify that the dedicated control channel is a channel carrying the first signaling.

12. A user equipment (UE) for device to device (D2D) communication, the UE comprising:
    a processor; and
    a transmitter,
    wherein the processor is configured to determine first signaling to be sent, wherein the first signaling is used for subsequent sending or receiving of at least one of D2D discovery and D2D communication, wherein the first signaling comprises a current quantity of hops; and
    the transmitter is configured to send the first signaling to a second UE using the D2D link, wherein the first signaling is carried by a D2D synchronization signal, wherein different sequences of the D2D synchronization signal are divided into M subgroups, and the M subgroups are used to carry information not exceeding n=floor($\log_2$(M)) bits, wherein a floor function represents rounding down to the nearest integer.

13. The UE according to claim 12, further comprising a receiver, wherein:
    the processor is configured to determine the first signaling according to preconfigured information; or
    the receiver is configured to receive signaling that is sent by a third UE using the D2D link, and the processor is configured to determine the first signaling according to the signaling that is sent by the third UE and that is received by the receiver; or
    the receiver receives signaling sent by a network device, and the processor is configured to determine the first signaling according to the signaling that is sent by the network device and that is received by the receiver.

14. The UE according to claim 12, wherein the information of comprised in the first signaling is further used to implicitly indicate second information comprised in the first signaling.

15. The UE according to claim 12, wherein the D2D synchronization signal comprises a primary sidelink synchronization signal (PSSS) and a secondary sidelink synchronization signal (SSSS), wherein sidelink synchronization signal identities (SLSSIDs) that correspond to the PSSS and the SSSS are integers not less than 336, and the SLSSIDs are used to identify a channel carrying the first signaling in the D2D link.

16. The UE according to claim 12, wherein the sending, by the transmitter, the first signaling to the second UE using the D2D link comprises:

sending the first signaling using a dedicated control channel or a non-control channel in the D2D link.

17. The UE according to claim 16, wherein the dedicated control channel further carries second signaling, and the second signaling is used to identify that the dedicated control channel is a channel carrying the first signaling.

* * * * *